US012553666B2

(12) United States Patent
Tanamura et al.

(10) Patent No.: US 12,553,666 B2
(45) Date of Patent: Feb. 17, 2026

(54) HEAT TREATMENT SYSTEM

(71) Applicants: NGK INSULATORS, LTD., Nagoya (JP); NGK KILNTECH, CORPORATION, Nagoya (JP)

(72) Inventors: Masashi Tanamura, Nagoya (JP); Tomoaki Oyama, Nagoya (JP); Takanori Isono, Nagoya (JP)

(73) Assignees: NGK INSULATORS, LTD., Nagoya (JP); NGK KILNTECH, CORPORATION, Nagoya (JP)

( * ) Notice: Subject to any disclaimer, the term of this patent is extended or adjusted under 35 U.S.C. 154(b) by 358 days.

(21) Appl. No.: 18/460,780

(22) Filed: Sep. 5, 2023

(65) Prior Publication Data

US 2024/0085111 A1 Mar. 14, 2024

(30) Foreign Application Priority Data

Sep. 14, 2022 (JP) ................................ 2022-146363

(51) Int. Cl.

*F27B 9/02* (2006.01)
*F27D 5/00* (2006.01)
*F27D 25/00* (2010.01)

(52) U.S. Cl.

CPC ............ *F27B 9/021* (2013.01); *F27D 5/0068* (2013.01); *F27D 25/00* (2013.01)

(58) Field of Classification Search

CPC ........ F27B 9/021; F27D 5/0068; F27D 25/00; B65G 65/23

See application file for complete search history.

(56) References Cited

FOREIGN PATENT DOCUMENTS

| | | | | |
|---|---|---|---|---|
| JP | H06154582 A * | 6/1994 | | |
| JP | 2008-145095 A | 6/2008 | | |
| JP | 2019-184211 A | 10/2019 | | |
| JP | 7041302 B1 | 3/2022 | | |
| WO | WO-2018191512 A1 * | 10/2018 | ............ | B65F 1/1473 |

(Continued)

OTHER PUBLICATIONS

English translation of JP-H06154582-A, dated Oct. 10, 2025 (Year: 2025).*

(Continued)

*Primary Examiner* — Edelmira Bosques
*Assistant Examiner* — Brett Peterson Mallon
(74) *Attorney, Agent, or Firm* — BURR PATENT LAW, PLLC

(57) ABSTRACT

A heat treatment system may include a heat treatment furnace configured to heat treat a material in a saggar, the saggar including a saggar body and a lid; a lid removing device configured to remove the lid from the saggar; a body conveyor configured to convey the saggar body; a lid conveyor configured to convey the lid; a recovery device configured to recover the material from the saggar body; a supply device configured to supply a non-heat-treated material to the saggar body; and a lid attaching device configured to attach the lid to the saggar body. A conveying time for the lid to be conveyed from an entrance to an exit of a conveying path of the lid conveyor may be shorter than a conveying time for the saggar body to be conveyed from an entrance to an exit of a conveying path of the body conveyor.

9 Claims, 4 Drawing Sheets

(56) References Cited

FOREIGN PATENT DOCUMENTS

WO 2019/138887 A1 7/2019

OTHER PUBLICATIONS

First Partial English translation of Japanese Third Party Submission dated Jun. 19, 2024 (Application No. 2022-146363).
Second Partial English translation of Japanese Third Party Submission dated Jun. 19, 2024 (Application No. 2022-146363).
Japanese Office Action (with English translation) dated Aug. 6, 2024 (Application No. 2022-146363).
Third Partial English translation of Japanese Third Party Submission dated Jun. 19, 2024 (Application No. 2022-146363).
Japanese Third Party Submission (with English translation) dated Oct. 16, 2024 (Application No. 2022-146363).

* cited by examiner

HEAT TREATMENT SYSTEM

CROSS-REFERENCE TO RELATED APPLICATION

The present application claims priority to Japanese Patent Application No. 2022-146363, filed on Sep. 14, 2022, the entire contents of which are incorporated herein by reference.

TECHNICAL FIELD

The disclosure herein relates to a technology for heat treating a material.

BACKGROUND ART

Heat treatment furnaces (e.g., roller hearth kilns, pusher kilns, etc.) may be used to heat treat materials. For example, in order to heat treat a material such as powder in a heat treatment furnace, the material is accommodated in a saggar for heat treatment. The saggar is used repeatedly. For example, Japanese Patent No. 7041302 describes an example of a heat treatment system including a supply device that supplies a material into a saggar, a heat treatment furnace that heat treats the material in the saggar, a recovery device that recovers the heat-treated material from the saggar, and a conveyor that conveys the saggar through the supply device, the heat treatment furnace, and the recovery device. The saggar is circulated in a conveying direction along a conveying path of the conveyor through the supply device, the heat treatment furnace, and the recovery device. In Japanese Patent No. 7041302, the saggar with a lid attached thereon is conveyed into the heat treatment furnace. The lid needs to be removed from the saggar body to supply the material to the saggar and to recover the heat-treated material from the saggar. The heat treatment system of Japanese Patent No. 7041302 includes lid removing mechanisms between the heat treatment furnace and the recovery device and between the supply device and the heat treatment furnace, and each lid removing mechanism is configured to remove the lid from the saggar body and attach the lid back to the saggar body. Each lid removing mechanism includes arms for gripping the lid. The lid is removed from the saggar body by the arms gripping the lid, and then only the saggar body is conveyed forward to the recovery device or the supply device. After the heat-treated material has been recovered from the saggar body by the recovery device or after the material has been supplied to the saggar body by the supply device, the saggar body is returned to below the arms gripping the lid, and then the lid is attached back to the saggar body. That is, in the heat treatment system of Japanese Patent No. 7041302, each lid is attached to its paired saggar body.

DESCRIPTION

Summary

In the heat treatment system of Japanese Patent No. 7041302, each saggar body is used in combination with its paired lid. However, saggar bodies, which are in direct contact with the material inside the heat treatment furnace, are more likely to deteriorate than the lids attached on top of the saggar bodies, and thus may be reused fewer times. If a certain saggar body and its paired lid are used many times for heat treatment and thereby thermally deformed, they may be unable to be used in combination with another lid/saggar body. That is, if a saggar is always used in combination with its paired lid, when the saggar body becomes no longer reusable, its lid cannot be used in combination with another saggar body even if the lid is still reusable.

The disclosure herein provides a technique for efficiently using both a saggar body and a lid.

In a first aspect of the technology disclosed herein, a heat treatment system may comprise a heat treatment furnace including an entrance and an exit, and configured to heat treat a material in a saggar while the saggar is conveyed from the entrance to the exit, the saggar including a saggar body and a lid removably attached to the saggar body; a lid removing device configured to remove the lid from the saggar that exited from the exit of the heat treatment furnace; a body conveyor configured to convey the saggar body from which the lid has been removed by the lid removing device; a lid conveyor configured to convey the lid removed by the lid removing device; a recovery device disposed on a conveying path of the body conveyor and configured to recover the material heat-treated in the heat treatment furnace from the saggar body; a supply device disposed on the conveying path of the body conveyor and downstream of the recovery device, and configured to supply a non-heat-treated material to the saggar body in which the material is not accommodated; and a lid attaching device configured to attach the lid conveyed by the lid conveyor to the saggar body in which the non-heat-treated material has been supplied while the saggar body is conveyed by the body conveyor. A conveying time for the lid to be conveyed from an entrance of a conveying path of the lid conveyor located close to the lid removing device to an exit of the conveying path of the lid conveyor located close to the lid attaching device may be shorter than a conveying time for the saggar body to be conveyed from an entrance of the conveying path of the body conveyor located close to the lid removing device to an exit of the conveying path of the body conveyor located close to the lid attaching device.

DETAILED DESCRIPTION

Figure 1:
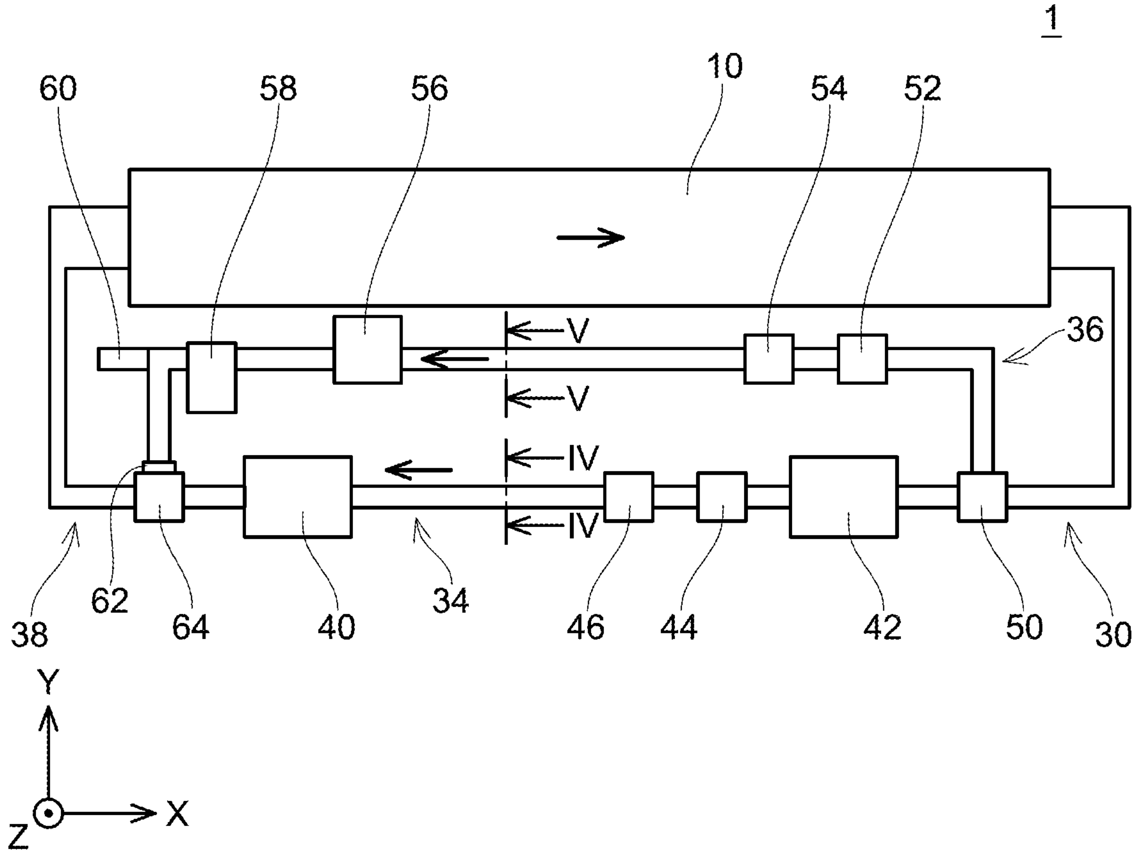
FIG. 1 shows a schematic diagram of a heat treatment system according to a first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved heat treatment systems, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Some of the features characteristic to below-described embodiments will herein be listed. It should be noted that the respective technical elements are independent of one another, and are useful solely or in combinations. The combinations thereof are not limited to those described in the claims as originally filed.

In a first aspect of the technology disclosed herein, a heat treatment system may comprise a heat treatment furnace including an entrance and an exit, and configured to heat treat a material in a saggar while the saggar is conveyed from the entrance to the exit, the saggar including a saggar body and a lid removably attached to the saggar body; a lid removing device configured to remove the lid from the saggar that exited from the exit of the heat treatment furnace; a body conveyor configured to convey the saggar body from which the lid has been removed by the lid removing device; a lid conveyor configured to convey the lid removed by the lid removing device; a recovery device disposed on a conveying path of the body conveyor and configured to recover the material heat-treated in the heat treatment furnace from the saggar body; a supply device disposed on the conveying path of the body conveyor and downstream of the recovery device, and configured to supply a non-heat-treated material to the saggar body in which the material is not accommodated; and a lid attaching device configured to attach the lid conveyed by the lid conveyor to the saggar body in which the non-heat-treated material has been supplied while the saggar body is conveyed by the body conveyor. A conveying time for the lid to be conveyed from an entrance of a conveying path of the lid conveyor located close to the lid removing device to an exit of the conveying path of the lid conveyor located close to the lid attaching device may be shorter than a conveying time for the saggar body to be conveyed from an entrance of the conveying path of the body conveyor located close to the lid removing device to an exit of the conveying path of the body conveyor located close to the lid attaching device.

In the above heat treatment system, the lid removed from the saggar body after the heat treatment and the saggar body are conveyed on different conveying paths. Further, the conveying time for the lid conveyed by the lid conveyor is shorter than the conveying time for the saggar body conveyed by the body conveyor. Since the conveying time for the lid and the conveying time for the saggar body are different, the lid can be attached to another saggar body. Thus, for example, even if the saggar body becomes no longer usable, the lid can still be used. Therefore, the saggar body and the lid can be respectively used appropriate times.

In a second aspect of the technology disclosed herein according to the first aspect, the conveying time for the saggar body to be conveyed from the entrance of the conveying path of the body conveyor to the exit of the conveying path of the body conveyor may be 1.1 to 5.0 times the conveying time for the lid to be conveyed from the entrance of the conveying path of the lid conveyor to the exit of the conveying path of the lid conveyor. With this configuration, the conveying time for the lid is appropriately shortened.

In a third aspect of the technology disclosed herein according to the first or second aspect, the heat treatment system may further comprise a lid adjusting mechanism disposed near the exit of the conveying path of the lid conveyor and configured to adjust the lid such that a front surface of the lid is oriented perpendicular to a conveying direction. The lid may be shaken and tilted while being conveyed on the conveying path of the lid conveyor. Since the lid adjusting mechanism adjusts the lid near the exit of the conveying path of the lid conveyor, which is close to the lid attaching device, the tilt-corrected lid can be sent off from the lid conveyor to the lid attaching device.

In a fourth aspect of the technology disclosed herein according to any one of the first to third aspects, the heat treatment system may further comprise a cleaning device disposed on the conveying path of the lid conveyor and configured to clean the lid. With this configuration, the material adhering to the lid can be removed, and thus the lid can be appropriately reused.

In a fifth aspect of the technology disclosed herein according to any one of the first to fourth aspects, the heat treatment system may further comprise a lid inspection device disposed on the conveying path of the lid conveyor and configured to inspect the lid. With this configuration, whether the lid has a defect, such as a crack, or not can be inspected to properly remove the lid if it is no longer reusable.

In a sixth aspect of the technology disclosed herein according to the fifth aspect, the heat treatment system may further comprise a lid recovery device disposed on the conveying path of the lid conveyor and downstream of the lid inspection device, and configured to recover a lid that was determined as having a defect by the lid inspection device. With this configuration, a lid that was determined as defective can be appropriately recovered from the conveying path of the lid conveyor.

In a seventh aspect of the technology disclosed herein according to any one of the first to sixth aspects, the heat treatment system may further comprise a lid supply device disposed on the conveying path of the lid conveyor and configured to supply a lid to the conveying path of the lid conveyor. With this configuration, a lid can be supplied to the conveying path of the lid conveyor. Thus, even when the number of lids conveyed by the lid conveyor is reduced, for example, due to broken lids, a lid shortage in the lid attaching device can be avoided.

In an eighth aspect of the technology disclosed herein according to the seventh aspect, the heat treatment system may further comprise a lid storage configured to store a lid to be supplied to the lid supply device.

In a ninth aspect of the technology disclosed herein according to any one of the first to eighth aspects, the heat treatment system may further comprise a first hood covering the conveying path of the body conveyor; and a second hood covering the conveying path of the lid conveyor. A height from a conveying surface of the lid conveyor to an upper surface of the second hood may be smaller than a height from a conveying surface of the body conveyor to an upper surface of the first hood. The lid is for covering the top of the saggar, and the height dimension of the lid is smaller than the height dimension of the saggar body. Therefore, even when the height of the second hood, which covers the conveying path of the lid conveyor configured to convey the lid, is smaller than the height of the first hood, which covers the conveying path of the body conveyor configured to convey the saggar body, the lid conveyor can convey the lid appropriately. By reducing the height of the second hood covering the conveying path of the lid conveyor, the surface area of the second hood is also reduced, which reduces the manufacturing cost of the second hood. Further, since the weight of the second hood is also reduced, the workload required to attach and detach the second hood can be reduced, for example, in maintenance. Moreover, since the overall size of the second hood is reduced, the second hood can be stored in a small space after detached.

Embodiments

With reference to the drawings, a heat treatment system 1 according to the present embodiment is described. As shown in FIG. 1, the heat treatment system 1 comprises a heat treatment furnace 10, a circulation and conveyor device (30, 34, 36, 38), a lid removing device 50, a material supply device 40, a material recovery device 42, a body cleaning device 44, a body crack detection device 46, a lid cleaning device 52, a lid crack detection device 54, a lid recovery device 56, a lid supply device 58, a lid storage 60, and a lid attaching device 64.

Figure 2:
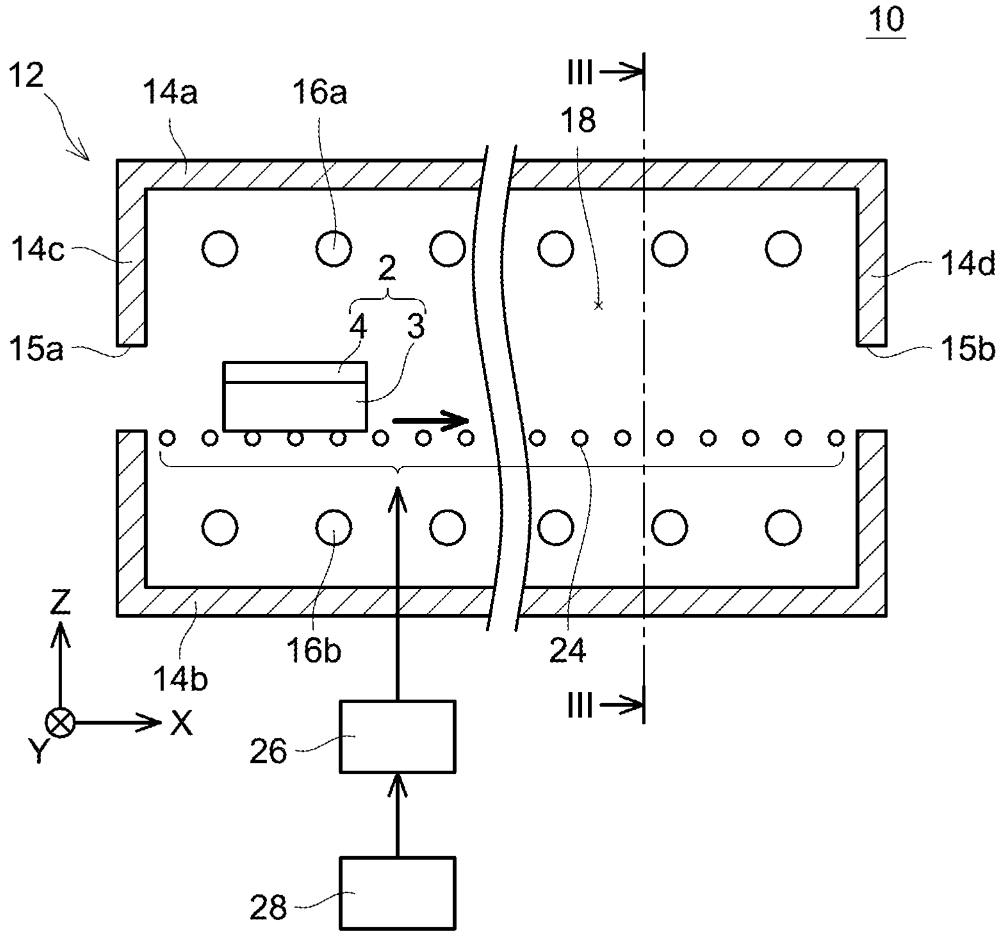
FIG. 2 shows a schematic diagram of a heat treatment furnace in a longitudinal cross-sectional view along a plane parallel to a conveying direction of a saggar.
Figure 3:
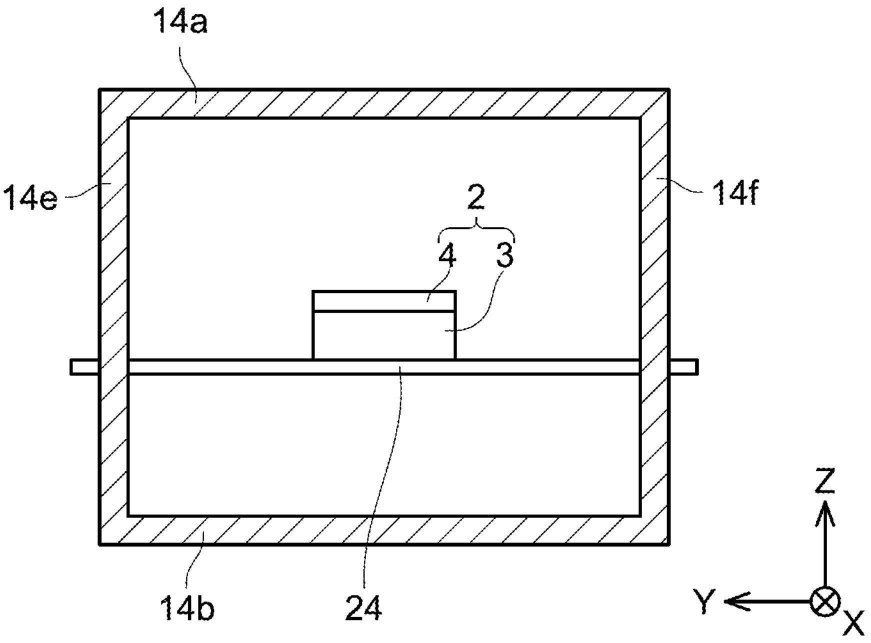
FIG. 3 is a cross-sectional view along a line III-III in FIG. 2.

The heat treatment system 1 heat treats a material contained in each saggar 2 (see FIG. 2). In this embodiment, the material in the saggars 2 is powder of a lithium-ion battery cathode material. As shown in FIGS. 2 and 3, each saggar 2 comprises a body 3 and a lid 4 that can be detachably attached to the body 3. As shown in FIG. 1, a saggar 2 is conveyed by the circulation and conveyor device (30, 34, 36, 38). The saggar 2 (with a combination of a body 3 and a lid 4) is conveyed through the heat treatment furnace 10, the lid 4 is removed from the body 3 by the lid removing device 50 (to be described later), the body 3 is conveyed by a body conveyor 34 (to be described later), and the lid 4 is conveyed by a lid conveyor 36 (to be described later). In other words, the body 3 and the lid 4 are conveyed on different conveying paths in part outside the heat treatment furnace 10. At the lid attaching device 64 (to be described later), a lid 4 is attached to a body 3, and this saggar 2 (with a new combination of the body 3 and the lid 4) is conveyed through the heat treatment furnace 10. In the heat treatment system 1 according to this embodiment, each saggar 2 circulates through the heat treatment furnace 10 and various devices (to be described later). The material is heat treated while each saggar 2 is conveyed through the heat treatment furnace 10.

The heat treatment furnace 10 heat treats the material in each saggar 2. As shown in FIGS. 2 and 3, the heat treatment furnace 10 comprises a furnace body 12 and a conveyor (24, 26). The heat treatment furnace 10 heat treats the material in the saggars 2 while the saggars 2 are conveyed through the furnace body 12 by the conveyor (24, 26).

The furnace body 12 has an outer shape of substantially cuboid, and a heat treatment space 18 therein is defined by a ceiling wall 14*a*, a bottom wall 14*b*, a furnace entrance wall 14*c*, a furnace exit wall 14*d*, and side walls 14*e* and 14*f* As shown in FIG. 2, the ceiling wall 14*a* is parallel to the bottom wall 14*b* (i.e., parallel to XY plane). The furnace entrance wall 14*c* is located at one end of a conveying path and is perpendicular to a conveying direction (i.e., parallel to YZ plane). The furnace exit wall 14*d* is located at the other end of the conveying path and is parallel to the furnace entrance wall 14*c* (i.e., parallel to YZ plane). As shown in FIG. 3, the side walls 14*e* and 14*f* are parallel to the conveying direction and perpendicular to the ceiling wall 14*a* and the bottom wall 14*b* (i.e., parallel to XZ plane). A plurality of heaters 16*a*, 16*b* and a plurality of conveyor rollers 24 are disposed in the heat treatment space of the furnace body 12. The heaters 16*a* are located above the conveyor rollers 24 and are spaced apart from each other at predetermined intervals in the conveying direction, and the heaters 16*b* are located below the conveyor rollers 24 and are spaced apart from each other at predetermined intervals in the conveying direction. By the heaters 16*a* and 16*b* producing heat, the space 18 in the furnace body 12 and the material in the saggar 2 are heated. As shown in FIG. 2, an opening 15*a* is formed in the furnace entrance wall 14*c* and an opening 15*b* is formed in the furnace exit wall 14*d*. Each saggar 2 is carried into the heat treatment furnace 10 through the opening 15*a* and carried out of the heat treatment furnace 10 through the opening 15*b* by the conveyor (24, 26). In other words, the opening 15*a* serves as an entrance of the heat treatment furnace 10 and the opening 15*b* serves as an exit of the heat treatment furnace 10.

The conveyor (24, 26) comprises the plurality of conveyor rollers 24 and a drive unit 26. The conveyor rollers 24 convey the saggars 2. The conveyor (24, 26) carries the saggars 2 into the heat treatment furnace 10 from the opening 15*a* and carries the saggars 2 out of the heat treatment furnace 10 from the opening 15*b*. The conveyor rollers 24 are each cylindrical, and their axes extend in a direction perpendicular to the conveying direction (i.e., in Y direction). The conveyor rollers 24 all have the same diameter and are equally spaced apart from each other in the conveying direction. The conveyor rollers 24 are supported such that they are rotatable about their axes and are rotated by drive power of the drive unit 26 being transmitted thereto. The drive unit 26 is a drive unit (e.g., a motor) configured to drive the conveyor rollers 24. The drive unit 26 is connected to the conveyor rollers 24 via a power transmission mechanism. When the drive power of the drive unit 26 is transmitted to the conveyor rollers 24 via the power transmission mechanism (e.g., a sprocket-chain mechanism), the conveyor rollers 24 are thereby rotated. The drive unit 26 drives each of the conveyor rollers 24 such that the conveyor rollers 24 rotate at approximately the same speed. The drive unit 26 is controlled by a controller 28. In the present embodiment, the conveyor rollers 24 all have the same diameter, but they may have different diameters. Conveyor rollers with different diameters may be installed in the heat treatment furnace 10.

As shown in FIG. 1, the circulation and conveyor device (30, 34, 36, 38) conveys the saggars 2 that exited from the exit (i.e., opening 15*b*) of the heat treatment furnace 10 to the entrance (i.e., opening 15*a*) of the heat treatment furnace 10. The circulation and conveyor device (30, 34, 36, 38) comprises a plurality of conveyor rollers 32 (see FIGS. 4 and 5) and a drive unit (not shown). The conveyor rollers 32 are each cylindrical, and their axes extend in the direction perpendicular to the conveying direction. The conveyor rollers 32 all have the same diameter and are equally spaced apart from each other in the conveying direction. The conveyor rollers 32 are supported such that they are rotatable about their axes and are rotated by drive power of the drive unit being transmitted thereto. The drive unit is a drive unit (e.g., a motor) configured to drive the conveyor rollers

32. The drive unit is connected to the conveyor rollers 32 via a power transmission mechanism. When the drive power of the drive unit is transmitted to the conveyor rollers 32 via the power transmission mechanism (e.g., a sprocket-chain mechanism), the conveyor rollers 32 are thereby rotated. The drive unit drives each of the conveyor rollers 32 such that the conveyor rollers 32 rotate at approximately the same speed. In the present embodiment, the conveyor rollers 32 all have the same diameter, but they may have different diameters. Conveyor rollers with different diameters may be installed on a conveying path of the circulation and conveyor device (30, 34, 36, 38).

The circulation and conveyor device (30, 34, 36, 38) comprises a carry-out conveyor 30, the body conveyor 34, the lid conveyor 36, and a carry-in conveyor 38. The carry-out conveyor 30 conveys the saggars 2 carried out of the exit (i.e., opening 15*b*) of the heat treatment furnace 10 to the lid removing device 50. The body conveyor 34 conveys bodies 3, from which lids 4 have been removed by the lid removing device 50 (to be described later), to the lid attaching device 64. The lid conveyor 36 conveys the lids 4 removed from the bodies 3 by the lid removing device 50 to the lid attaching device 64. The carry-in conveyor 38 conveys saggars 2, after the lids 4 have been attached to the bodies 3 by the lid attaching device 64 (to be described later), to the entrance (i.e., opening 15*a*) of the heat treatment furnace 10. In this embodiment, after the lids 4 are removed from the bodies 3 by the lid removing device 50, the bodies 3 are conveyed by the body conveyor 34, the lids 4 are conveyed by the lid conveyor 36, and the bodies 3 join the lids 4 in the lid attaching device 64. That is, for the saggars 2 each including a body 3 and a lid 4, their bodies 3 and lids 4 are conveyed on different conveying paths in part outside the heat treatment furnace 10. Further, in this embodiment, a conveying time for each lid 4 to be conveyed on the conveying path of the lid conveyor 36 is shorter than a conveying time for each body 3 to be conveyed on the conveying path of the body conveyor 34. The body conveyor 34 and the lid conveyor 36 will be described in detail later.

The lid removing device 50 is located downstream of the exit of the heat treatment furnace 10. The lid removing device 50 removes a lid 4 from a body 3 of each saggar 2 (i.e., a saggar 2 with a lid 4 attached to a body 3) after the saggar 2 is carried out from the exit of the heat treatment furnace 10. The lid removing device 50 may have any configuration as long as it is configured to remove the lid 4 from the body 3 of the saggar 2, and its specific configuration is not limited. For example, the lid removing device 50 comprises a gripper for gripping the lid 4 and is configured to move the gripper toward and away from the body 3. By moving the gripper away from the body 3 while the gripper is gripping the lid 4, the lid 4 is removed from the body 3. Once the lid 4 is removed, the body 3 is sent off onto the conveying path of the body conveyor 34, and the lid 4 removed from the body 3 is sent off onto the conveying path of the lid conveyor 36.

On the conveying path of the body conveyor 34, the material recovery device 42, the body cleaning device 44, the body crack detection device 46, and the material supply device 40 are disposed. After sent off from the lid removing device 50, the body 3 is conveyed, by the body conveyor 34, through the material recovery device 42, the body cleaning device 44, the body crack detection device 46, and the material supply device 40.

The material recovery device 42 is disposed on the conveying path of the body conveyor 34. The material recovery device 42 is located between the lid removing device 50 and the body cleaning device 44. The material recovery device 42 recovers the material (i.e., powder) that has been heat-treated in the heat treatment furnace 10 from the body 3. The material recovery device 42 may have any configuration as long as it is configured to recover the powder from the body 3, and its specific structure is not limited. For example, the material recovery device 42 comprises an inversion mechanism that inverts the body 3 upside down to recover the heat-treated material and an air recovery mechanism that recovers the heat-treated material (in this embodiment, powder) adhering to the surface of the body 3 by peeling it off with air. The inversion mechanism inverts the body 3 upside down to transfer the powder in the body 3 into a recovery container. As a result, almost all of the powder in the body 3 is transferred into the recovery container. Thereafter, the inversion mechanism inverts the body 3 upside down again to return it to its original orientation. The air recovery mechanism is used after the powder in the body 3 has been recovered by the inversion mechanism. The air recovery mechanism blows air onto the inner surface of the body 3 while suctioning air inside the body 3. By blowing air onto the inner surface of the body 3, the powder adhering to the inner surface of the body 3 is peeled off from the inner surface. Suctioning air in the body 3 while blowing air onto the inner surface of the body 3 allows the powder peeled off from the inner surface of the body 3 to be suctioned together with the air. Thus, the powder remaining on the inner surface of the body 3 is recovered and a powder recovery rate is increased. In the above example, the material recovery device 42 comprises the air recovery mechanism, but it is not limited to such a configuration. For example, the powder remaining on the inner surface of the body 3 may be peeled off from the inner surface of the body 3 with a rotating brush to be recovered.

The body cleaning device 44 is disposed on the conveying path of the body conveyor 34. The body cleaning device 44 is located between the material recovery device 42 and the body crack detection device 46. The body cleaning device 44 cleans the inner surface of the body 3 after the heat-treated material (i.e., powder) has been recovered by the material recovery device 42. The body cleaning device 44 may have any configuration as long as it is configured to clean the inner surface of the body 3, and its specific structure is not limited. For example, the body cleaning device 44 suctions air, etc. in the body 3 while peeling off substances adhering to the inner surface of the body 3 with a rotating brush. The suctioned air, etc. contains the substances peeled. By cleaning the inner surface of the body 3 by the body cleaning device 44, the powder and other substances remaining on the inner surface of the body 3 can be completely removed.

The body crack detection device 46 is disposed on the conveying path of the body conveyor 34. The body crack detection device 46 is located between the body cleaning device 44 and the material supply device 40. The body crack detection device 46 inspects whether the body 3 is cracked or not by detecting cracks in the body 3. The saggars 2 are repeatedly used for heat treatment of the material in the heat treatment furnace 10. The body crack detection device 46 inspects whether the body 3 is cracked or not after it has been used for heat treatment of the material in the heat treatment furnace 10 and before it is reused. The body crack detection device 46 may have any configuration as long as it is configured to detect whether the body 3 is cracked or not, and its specific configuration is not limited. For example, the body crack detection device 46 may detect cracks in the body 3 using a laser. The body crack detection device 46 may also detect cracks in the body 3 by filling the body 3 with gas and measuring the pressure inside the body 3. If it is detected that the body 3 is cracked, the body crack detection device 46 removes the body 3 from the conveying path of the body conveyor 34. That is, the body crack detection device 46 also functions as a recovery device that recovers bodies 3 with cracks from the heat treatment system 1. If it is not detected that the body 3 is cracked, the body 3 is conveyed to the material supply device 40 by the body conveyor 34. In this embodiment, the body crack detection device 46 also functions as a recovery device for bodies 3, however, a recovery device that recovers cracked bodies 3 from the heat treatment system 1 may be disposed downstream of the body crack detection device 46.

The material supply device 40 is disposed on the conveying path of the body conveyor 34. The material supply device 40 is located between the body crack detection device 46 and the lid attaching device 64. The material supply device 40 supplies non-heat-treated material (i.e., powder) into the body 3. The material supply device 40 may have any configuration as long as it is configured to supply the powder into the body 3, and its specific structure is not limited. For example, the material supply device 40 comprises a powder supplying part and a leveling part. The powder supplying part is configured to supply the powder into the body 3. Specifically, the powder supplying part comprises a supply port through which the powder falls into the body 3 from above the body 3. The supply port is positioned such that it is located above the center of the body 3 when the body 3 is in the powder supplying part. The powder supplying part comprises a positioner that positions the body 3, when it is conveyed to the powder supplying part, such that it is positioned below the supply port. The powder supplying part may include a plurality of supply ports. Since the powder supplying part supplies the powder into the body 3 by dropping the powder from above, once the powder has been supplied into the body 3 in the powder supplying part, the top surface of the powder in the body 3 has a raised portion right below the supply port. The leveling part levels the powder supplied into the body 3 by the powder supplying part. Specifically, the leveling part is configured to level the top surface of the powder by pressing a side surface of a flat plate against the top surface of the powder in the body 3. By leveling the top surface of the powder using the leveling part, the top surface of the powder in the body 3 becomes substantially horizontal.

On the conveying path of the lid conveyor 36, the lid cleaning device 52, the lid crack detection device 54, the lid recovery device 56, and the lid supply device 58 are disposed. After sent off from the lid removing device 50, the lid 4 is conveyed, by the lid conveyor 36, through the lid cleaning device 52, the lid crack detection device 54, the lid recovery device 56, and the lid supply device 58.

The lid cleaning device 52 is disposed on the conveying path of the lid conveyor 36. The lid cleaning device 52 is located between the lid removing device 50 and the lid crack detection device 54. The material (i.e., powder) in the body 3 may adhere to a surface of the lid 4 that faces the body 3 when the lid 4 is on the body 3. The lid cleaning device 52 cleans the material adhering to the lid 4. The lid cleaning device 52 may have any configuration as long as it is configured to clean the lid 4, and its specific structure is not limited. For example, the lid cleaning device 52 may have the same configuration as that of the body cleaning device 44 described above. By cleaning the lid 4 in the lid cleaning device 52, the powder and other substances on the surface of the lid 4 can be completely removed.

The lid crack detection device 54 is disposed on the conveying path of the lid conveyor 36. The lid crack detection device 54 is located between the lid cleaning device 52 and the lid recovery device 56. The lid crack detection device 54 inspects whether the lid 4 is cracked or not by detecting cracks in the lid 4. As mentioned above, the saggars 2 are repeatedly used in the heat treatment furnace 10 for heat treatment of the material. The lid crack detection device 54 inspects whether the lid 4 is cracked or not after it has been used for heat treatment of the material in the heat treatment furnace 10 and before it is reused. The lid crack detection device 54 may have any configuration as long as it is configured to detect whether the lid 4 is cracked or not, and its specific configuration is not limited. For example, the lid crack detection device 54 may have the same configuration as that of the body crack detection device 46 described above.

The lid recovery device 56 is disposed on the conveying path of the lid conveyor 36. The lid recovery device 56 is located downstream of the lid crack detection device 54, and in this embodiment, it is located between the lid crack detection device 54 and the lid supply device 58. The lid recovery device 56 recovers lids 4 for which cracks have been detected by the lid crack detection device 54. In other words, lids 4 for which cracks have been detected by the lid crack detection device 54 are not conveyed downstream from the lid recovery device 56 (specifically, to the lid supply device 58). By the lid recovery device 56 recovering lids 4 for which cracks have been detected by the lid crack detection device 54, the reuse of these defective lids 4 can be avoided. Lids 4 for which cracks have not been detected by the lid crack detection device 54 are conveyed to the lid supply device 58 via the lid recovery device 56.

The lid supply device 58 is disposed on the conveying path of the lid conveyor 36. The lid supply device 58 is located between the lid recovery device 56 and the lid attaching device 64. The lid supply device 58 supplies new lids 4 onto the conveying path of the lid conveyor 36. Specifically, if one or more lids 4 are recovered by the lid recovery device 56, the lid supply device 58 supplies one or more new lids 4 (i.e., lids 4 other than the lids 4 currently circulating on the conveying path in the heat treatment system 1) to the conveying path of the lid conveyor 36. Recovering one or more lids 4 by the lid recovery device 56 reduces the number of lids 4 circulating on the conveying path in the heat treatment system 1. By supplying one or more lids 4 by the lid supply device 58, the lids 4 can be supplied automatically and a shortage of lids 4 to be attached to bodies 3 can be avoided.

The lid storage 60 for storing lids 4 is disposed near the lid supply device 58. The lid storage 60 is located at a different position from where the conveying path of the lid conveyor 36 is and is positioned to be able to replenish the lid supply device 58 with lids 4. In this embodiment, the lid storage 60 is connected to the conveying path of the lid conveyor 36 and replenishes the lid supply device 58 with lids 4 via a part of the conveying path of the lid conveyor 36. A shortage of lids 4 to be supplied from the lid supply device 58 can be prevented by the lid storage 60.

The lid attaching device 64 is located upstream of the entrance of the heat treatment furnace 10. At the lid attaching device 64, the conveying path of the body conveyor 34 joins the conveying path of the lid conveyor 36. That is, bodies 3 conveyed by the body conveyor 34 (specifically, bodies 3 to which the material has been supplied by the material supply device 40) as well as lids 4 conveyed by the lid conveyor 36 (specifically, lids 4 that have passed through the lid supply device 58 or lids 4 supplied to the conveying path from the lid supply device 58) are conveyed into the lid attaching device 64. The lid attaching device 64 attaches each lid 4 conveyed by the lid conveyor 36 to a body 3 conveyed by the body conveyor 34. The lid attaching device 64 may have any configuration as long as it is configured to attach a lid 4 to a body 3, and its specific configuration is not limited. For example, the lid attaching device 64 comprises a gripper for gripping a lid 4, and the gripper is configured to be movable in X, Y, and Z directions with respect to a body 3. A lid 4 is gripped by the gripper, moved to above a body 3, and attached to the body 3. Before conveyed into the lid attaching device 64, each body 3 is supplied with the material by the material supply device 40. In the lid attaching device 64, each lid 4 is attached to a body 3 containing the material therein.

A lid adjusting mechanism 62 for adjusting each lid 4 is disposed near an exit of the conveying path of the lid conveyor 36 that is close to the lid attaching device 64. As shown in FIGS. 2 and 3, in this embodiment, each saggar 2 is rectangular when viewed from above, and each lid 4 is also rectangular when viewed from above. The lids 4 may be tilted while being conveyed on the conveying path of the lid conveyor 36. The lid attaching device 64 may fail to grip such a tilted lid 4. The lid adjusting mechanism 62 adjusts the lids 4 such that front surfaces of the lids 4 are oriented perpendicular to the conveying direction. The lid adjusting mechanism 62 may comprise, for example, a flat-plate shaped stopper. The stopper of the lid adjusting mechanism 62 is arranged perpendicular to the conveying direction, and can move upward and downward. When the stopper of the lid adjusting mechanism 62 moves upward, the front surface of a lid 4 contacts the stopper of the lid adjusting mechanism 62, and the front surface of the lid 4 is thereby adjusted to be perpendicular to the conveying direction. When the stopper of the lid adjusting mechanism 62 moves downward, the lid 4 can pass over the lid adjusting mechanism 62. The lid adjusting mechanism 62 allows the lid attaching device 64 to securely grip a lid 4, so that the lid 4 can be properly attached to a body 3. Once the lid 4 is attached to a body 3, this saggar 2 (i.e., the saggar 2 with the combination of the lid 4 and the body 3) is conveyed into the heat treatment furnace 10 by the carry-in conveyor 38.

The body conveyor 34 and lid conveyor 36 are now described in more detail. In this embodiment, the conveying time for each lid 4 to be conveyed on the conveying path of the lid conveyor 36 is shorter than the conveying time for each body 3 to be conveyed on the conveying path of the body conveyor 34. The reason of this is as follows. The material recovery device 42, the body cleaning device 44, the body crack detection device 46, and the material supply device 40 are disposed on the conveying path of the body conveyor 34 (i.e., between the lid removing device 50 and the lid attaching device 64). During the conveyance of the bodies 3 through the devices 42, 44, 46, and 40, each of these devices takes some time to work on the bodies 3. Meanwhile, the lid cleaning device 52, the lid crack detection device 54, the lid recovery device 56, and the lid supply device 58 are disposed on the conveying path of the lid conveyor 36 (i.e., between the lid removing device 50 and the lid attaching device 64). When the lids 4 are conveyed through the lid cleaning device 52 and the lid crack detection device 54, each of these devices takes some time to work on the lids 4. However, if the lids 4 are to be reused (if the lid crack detection device 54 detected that the lids 4 are not cracked), they just pass through the lid recovery device 56 and the lid supply device 58, and these devices take no time to work on such lids 4. Further, since the volume of the lids 4 is smaller than that of the bodies 3, and thus its surface area is also smaller, the time required to work on the lids 4 in the lid cleaning device 52 and the lid crack detection device 54 is shorter than the time required to work on the bodies 3 in the body cleaning device 44 and the body crack detection device 46. Therefore, the conveying time for each lid 4 to be conveyed on the conveying path of the lid conveyor 36 (hereinafter simply referred to as the conveying time for the lids 4) is shorter than the conveying time for each body 3 to be conveyed on the conveying path of the body conveyor 34 (hereinafter simply referred to as the conveying time for the bodies 3). Specifically, the conveying time for the bodies 3 is 1.1 to 5.0 times the conveying time for the lids 4.

The shorter conveying time for the lids 4 than the conveying time for the bodies 3 allows the number of lids 4 to be less than the number of bodies 3. In this embodiment, the total number of lids 4 used simultaneously in the heat treatment system 1 is less than the total number of bodies 3. Looking at the heat treatment system 1 at a certain point in time, the total number of lids 4 is equal to the total number of bodies 3 in the heat treatment furnace 10 and on the carry-out conveyor 30 and the carry-in conveyor 38. Thus, the total number of lids 4 on the lid conveyor 36 is less than the total number of bodies 3 on the body conveyor 34. By adjusting the conveying time for saggars 2 (i.e., each including a body 3 and a lid 4) to be conveyed in the heat treatment furnace 10 and on the carry-out conveyor 30 and the carry-in conveyor 38, the conveying time for bodies 3, and the conveying time for lids 4, the number of lids 4 can be maintained less than the number of bodies 3, while the material can be efficiently heat treated in the heat treatment furnace. Since the number of lids 4 is less than the number of bodies 3, costs for lids 4 can be reduced. Further, since the conveying time for lids 4 is shorter than the conveying time for bodies 3 and the number of lids 4 is less than the number of bodies 3, combinations of the lids 4 and the bodies 3 vary. If a lid 4 is always used in combination with a specific body 3 and they are thermally deformed during heat treatment, the lid 4 may not be able to be used in combination with another body 3 and the body 3 may not be able to be used in combination with another lid 4. That is, if the combination of a lid 4 and a body 3 is fixed and one of the lid 4 and the body 3 becomes no longer usable, the other becomes no longer reusable either. In this embodiment, combinations of the lids 4 and bodies 3 are not fixed, so that even when one of lid 4 and body 3 becomes no longer usable, the other can still be reused. In particular, the bodies 3 are reused fewer times compared to the lids 4 because the bodies 3 directly contact the material during heat treatment. In this embodiment, each body 3 and each lid 4 can be reused an appropriate number of times. Further, since the conveying time for lids 4 is shorter, the time from when a lid 4 is conveyed out from the heat treatment furnace 10 to when the lid 4 is conveyed into the heat treatment furnace 10 is shorter than that of a body 3. Therefore, the lids 4 can be conveyed into the heat treatment furnace 10 again before they are completely cooled, which reduces the energy required to raise temperatures of the lids 4. It is clear from the above that the lids 4 and the bodies 3 are not used in fixed combinations, but they may be sometimes used in the same combinations by chance over the repeated use of the lids 4 and bodies 3. However, the frequency of this chance event can be controlled to be less by adjusting the number of bodies 3 relative to the number of lids 4. Therefore, the chance event that the lids 4 and bodies 3 are used in the same combinations is not a problem.

In this embodiment, a conveying speed (drive force of a drive unit, which is not shown) at which the bodies 3 are conveyed by the body conveyor 34 is the same as a conveying speed (drive force of a drive unit, which is not shown) at which the lids 4 are conveyed by the lid conveyor 36, but these speeds may be different. For example, the conveying speed at which the lids 4 are conveyed by the lid conveyor 36 may be faster than the conveying speed at which the bodies 3 are conveyed by the body conveyor 34.

Figure 4:
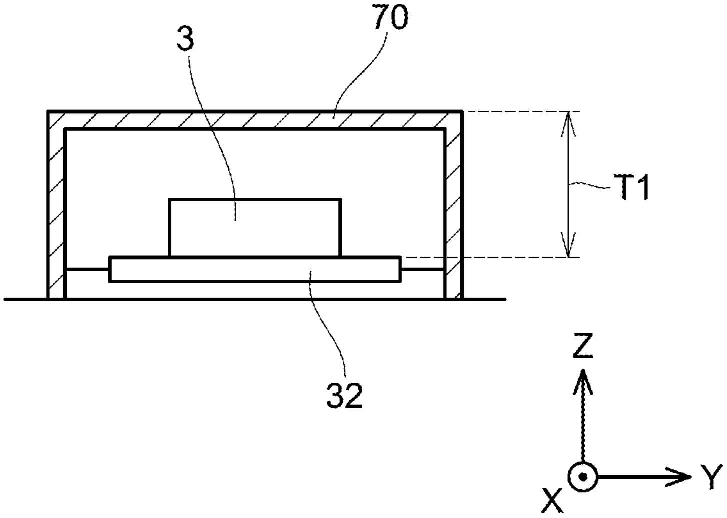
FIG. 4 is a cross-sectional view along a line IV-IV in FIG. 1.
Figure 5:
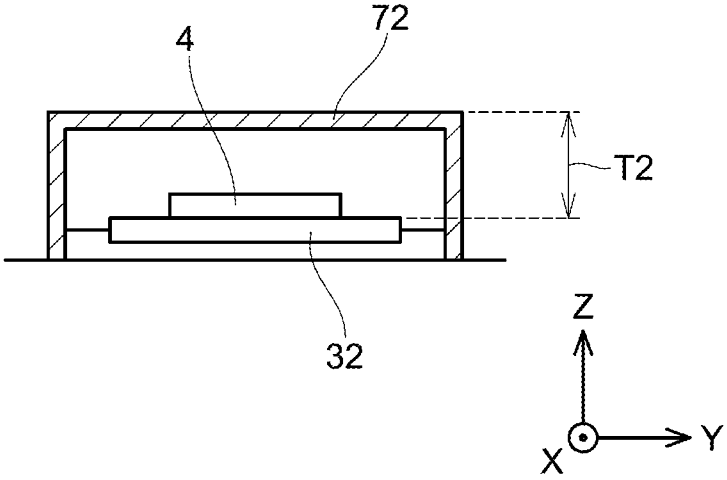
FIG. 5 is a cross-sectional view along a line V-V in FIG. 1.

As shown in FIG. 4, the conveying path of the body conveyor 34 is covered by a hood 70, and as shown in FIG. 5, the conveying path of the lid conveyor 36 is covered by a hood 72. By the conveying path of the body conveyor 34 being covered by the hood 70, foreign matters, etc. from the outside are prevented from adhering to the bodies 3 on the body conveyor 34. Similarly, by the conveying path of the lid conveyor 36 being covered by the hood 72, foreign matters, etc. from the outside are prevented from adhering to the lids 4 on the lid conveyor 36. Although not shown, the conveying paths of the carry-out conveyor 30 and the carry-in conveyor 38 are also covered by hoods. Thus, foreign matters, etc. from the outside are prevented from adhering to the saggars 2 on the carry-out conveyor 30 and the carry-in conveyor 38.

The height dimension of each lid 4 is smaller than the height dimension of each body 3 (see FIGS. 2 and 3). For this reason, as shown in FIGS. 4 and 5, a height T2 from a conveying surface of the lid conveyor 36 to an upper surface of the hood 72 can be smaller than a height T1 from a conveying surface of the body conveyor 34 to an upper surface of the hood 70. Since the height T2 is smaller than the height T1, the height dimension of the hood 72 covering the conveying path of the lid conveyor 36 can be reduced and the surface area of the hood 72 can thus be reduced, which reduces costs for the hood 72. Further, the reduced-size hood 72 means that the weight of the hood 72 is also reduced. This helps reduce workload on a worker when the worker removes the hood 72, for example, for maintenance. Further, the reduced-size hood 72 is space-saving, for example, in terms of a storage space for storing spare hoods 72.

The following are some notes on the heat treatment system 1 described in the embodiment. The body 3 in the embodiment is an example of "saggar body", the material supply device 40 is an example of "supply device", the material recovery device 42 is an example of "recovery device", the lid cleaning device 52 is an example of "cleaning device", the lid crack detection device 54 is an example of "lid inspection device", the hood 70 is an example of "first hood", and the hood 72 is an example of "second hood".

Specific examples of the disclosure herein have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the purpose of the examples illustrated by the present description or drawings is to satisfy multiple objectives simultaneously, and satisfying any one of those objectives gives technical utility to the present disclosure.

What is claimed is:

1. A heat treatment system comprising:

a heat treatment furnace including an entrance and an exit, and configured to heat treat a material in a saggar while the saggar is conveyed from the entrance to the exit, the saggar including a saggar body and a lid removably attached to the saggar body;

a lid removing device configured to remove the lid from the saggar that exited from the exit of the heat treatment furnace;

a body conveyor configured to convey the saggar body from which the lid has been removed by the lid removing device;

a lid conveyor configured to convey the lid removed by the lid removing device;

a recovery device disposed on a conveying path of the body conveyor and configured to recover the material heat-treated in the heat treatment furnace from the saggar body;

a supply device disposed on the conveying path of the body conveyor and downstream of the recovery device, and configured to supply a non-heat-treated material to the saggar body in which the material is not accommodated; and a lid attaching device configured to attach a lid conveyed by the lid conveyor to a saggar body in which the non-heat-treated material has been supplied while the saggar body is conveyed by the body conveyor, wherein a conveying time for the lid to be conveyed from an entrance of a conveying path of the lid conveyor located close to the lid removing device to an exit of the conveying path of the lid conveyor located close to the lid attaching device is shorter than a conveying time for the saggar body to be conveyed from an entrance of the conveying path of the body conveyor located close to the lid removing device to an exit of the conveying path of the body conveyor located close to the lid attaching device.

2. The heat treatment system according to claim 1, wherein the conveying time for the saggar body to be conveyed from the entrance of the conveying path of the body conveyor to the exit of the conveying path of the body conveyor is 1.1 to 5.0 times the conveying time for the lid to be conveyed from the entrance of the conveying path of the lid conveyor to the exit of the conveying path of the lid conveyor.

3. The heat treatment system according to claim 1, further comprising a lid adjusting mechanism disposed near the exit of the conveying path of the lid conveyor and configured to adjust the lid such that a front surface of the lid is oriented perpendicular to a conveying direction.

4. The heat treatment system according to claim 1, further comprising a cleaning device disposed on the conveying path of the lid conveyor and configured to clean the lid.

5. The heat treatment system according to claim 1, further comprising a lid inspection device disposed on the conveying path of the lid conveyor and configured to inspect the lid.

6. The heat treatment system according to claim 5, further comprising a lid recovery device disposed on the conveying path of the lid conveyor and downstream of the lid inspection device, and configured to recover a lid that was determined as having a defect by the lid inspection device.

7. The heat treatment system according to claim 6, further comprising a lid supply device disposed on the conveying path of the lid conveyor and configured to supply a lid to the conveying path of the lid conveyor.

8. The heat treatment system according to claim 7, further comprising a lid storage configured to store a lid to be supplied to the lid supply device.

9. The heat treatment system according to claim 1, wherein the heat treatment system further comprising:

a first hood covering the conveying path of the body conveyor; and a second hood covering the conveying path of the lid conveyor, and a height from a conveying surface of the lid conveyor to an upper surface of the second hood is smaller than a height from a conveying surface of the body conveyor to an upper surface of the first hood.

* * * * *